Patented Apr. 24, 1928.

1,666,936

UNITED STATES PATENT OFFICE.

LUDWIG KERN, OF BALTIMORE, MARYLAND.

PROCESS OF MANUFACTURING CERAMIC PRODUCTS.

No Drawing. Application filed October 13, 1925. Serial No. 62,306.

The present invention relates to manufacturing bricks, tiles and other elements useful in the manufacture of houses and buildings, such products being of the general nature of sand lime bricks, but being substantially improved in regard to their properties, as will appear below.

Heretofore, in spite of the numerous patents which have been granted on sand lime bricks, these do not seem to have become extensively used in building operations, probably on account of the fact that the bricks, when made by the existing processes are not sufficiently strong and are not uniform in strength, and possess other disadvantages, out-weighing the advantage of cheapness in the cost of production.

In the general manufacture of sand lime bricks, highly pure sand is mixed with from 5 to 10% of calcium hydroxide (slaked lime) together with enough water to produce a somewhat damp mass, which is then pressed into the form of bricks, which can subsequently be indurated in an atmosphere of steam, so that there is ultimately produced a certain amount of calcium silicate serving as a binder in the sand lime bricks. The prior art does not seem to pay any attention to the question of whether or not any of the silica in the sand exists in the form of hydrated silicic acid, and while ordinary sand may in some instances contain very slight traces of hydrated silicic acid, the amount thereof is very uncertain and very variable.

I have found that by the addition of a substantial quantity of hydrated silicic acid, I am able to produce sand lime bricks which are many times stronger than those heretofore produced, and furthermore I can produce sand lime bricks of which the strength is a relatively uniform property of the bricks, by proper proportioning the hydrated silicic acid.

As the source of the hydrated silicic acid, I may employ kieselguhr, although in some instances other forms of hydrated silicic acid can be employed, and I call attention to the possibility of utilizing hydrated silicic acid produced as a by-product, and in fact produced as substantially a waste product in certain industries, notably in the manufacture of super-phosphate.

In accordance with the present invention, I may also (i. e. in addition to the above) employ various forms of hydrated aluminum silicates, such as clays, including fuller's earth, bentonite, montmorillionite, allophane or other hydrated aluminum silicates of low specific gravity, which have the effect of further promoting the silicification of the lime. In addition to the above, agents may be added which are capable of increasing the reactivity, thereby accelerating the formation of calcium silicate as a binder, such materials being for example caustic soda, caustic potash, magnesium hydroxide, waterglass. The carbonates of the alkali metals can also be employed for this purpose.

I call attention to the fact that silica is composed essentially of silicon dioxide, in an anhydrous condition, whereas kieselguhr is a material containing a large amount of hydrated silicic acid, and even the silica present in kieselguhr seems to be substantially more reactive than that contained in sand, probably on account of the fact that the particles of the anhydrous silica in the kieselguhr are extremely small and exist in the form of very thin layers.

As an example of the invention, I cite the following:—100 parts by weight of sand, of any desired degree of fineness, or sand of mixed degrees of fineness (i. e. course and fine together) is mixed with 3 parts of kieselguhr and 8 parts of slaked lime, and a small amount of water is preferably added to moisten the mass sufficiently to enable it to be readily molded, in ordinary brick making machines or machines for making tile or similar elements used especially for building operations. The mass, after being molded, is subjected to an indurating treatment, for example as follows. The bricks or the like can be stacked upon cars, which are introduced into a steel or iron chamber of sufficient size, and high pressure steam is injected into this chamber, and the bricks kept under a constant pressure of say 10 atmospheres for about 8 hours. It will be understood that steam at a pressure of 10 atmospheres corresponds to a temperature of about 180° C. During this period, a large amount of the hydrated silicic acid of the kieselguhr, together with probably also some of the silica present will react with the lime with the production of calcium silicate, which constitutes the real binder. After mixing up the raw materials, and after adding water thereto, the mass is preferably aged or cured by being kept for several days or a week or more, for example in an open or closed tank, a closed tank being preferable in order not to allow the lime to become carbonated by the action of carbon dioxide in the atmosphere during this stage. If desired the mass can be mixed in a rather moist condition, and the hydrated aluminum silicates above referred to or the reaction accelerating agent, or both can be added before the ageing or curing period, or if desired these materials can be added during or after the curing period, and before the final stage of pressing into blocks or bricks. The material if desired can be subjected to a remixing at the end of the curing operation, or at any stage during the curing operation. The proportion of hydrated silicic acid can vary considerably, and if desired I may use an amount of this material substantially chemically equivalent to the amount of lime used. Ordinarily however I preferably use substantially less than this amount.

In connection with the steam treatment or induration, carbon dioxide or gases containing the same can also be injected at this stage. Chimney gases, from burning coal and like fuels can be used, these gases containing a sufficient amount of carbon dioxide for the purpose. The amount of pressure stated above is given only by way of example, and the pressure can be varied within wide ranges, as well as the time of treatment. The treatment with carbon dioxide or gases containing the same is to some extent optional, and if employed, this treatment can be simultaneous with the treatment with steam, or I may alternate the process, giving a few hours treatment with steam, and then a few hours treatment with gases containing carbon dioxide.

The reaction of the hydrated silicic acid is greatly accelerated by the use of steam as well as by the use of carbon dioxide. On account of the porosity of the material caused by the admixture of kieselguhr, the introduction of the carbon dioxide and steam or either of these, is greatly facilitated and the hardening process accordingly accelerated, the complete hardening process being brought about in some cases within from 5 to 10 hours. The pressure used in this step can vary widely, pressures from 5 to 25 atmospheres or more may be used giving satisfactory results. In some cases it may be desirable to apply the steam or gas pressure while the bricks are in a rather wet condition, being first sprinkled with water, in addition to the water contained in the initial mixture from which the bricks are made. The bricks can also be made up from a wetter mass than usual, thereby furnishing water in the subsequent induration step.

When using quartz, flint and other highly siliceous material, it is advisable to first reduce these to a finely powdered condition. This can readily be accomplished by heating the same to a bright red heat, and suddenly quenching the same in cold water. As a result of this procedure the materials become brittle and friable and can be easily ground to an impalpable powder. While these materials can be ground to about the coarseness of ordinary sand, it is preferable to grind the same to a much finer degree, say so that they will pass through a screen of 100–150 meshes per linear inch.

The amount of hydrated silicic acid to be employed can vary between wide limits, and for ordinary purposes I prefer to employ from about 3 or 5 up to 10 percent of silicic acid. If clay and other hydrated aluminum silicates are to be employed, the proportion thereof can likewise vary a good deal, say from about 10% up to about 25%.

The lime should preferably be freshly burned, and should be free or substantially free from carbonates. The lime ought also to be thoroughly slaked by the addition of water, an amount of water somewhat greater than that theoretically necessary should be employed in all cases, to be sure that the lime is thoroughly slaked.

The molded articles can if desired be treated with water carrying a small amount of fluorides, such as aluminum fluoride, iron fluoride, or magnesium fluoride, this treatment being preferably effected after the induration treatment. The effect of this treatment is to protect the blocks or bricks more completely against atmospheric influences. The bricks, after induration, can likewise be coated with bitumen or asphalt, in order to thoroughly water-proof the same, this being important in the construction of foundations, particularly in the case of construction in land which is relatively wet, or is likely to be wet in some seasons of the year.

If it is desired to color the bricks, various substances can be added to the mixture, preferably before molding the same into blocks, for example during the mixing operation. Examples of such substances are metal oxides, such as those of iron, manganese, chromium, or other metals, also graphite, soot and various others. In many cases it is desirable to color only the face or surface of the product, the same being impregnated for this purpose with a suspension of white lead, basic lead sulphate, barium sulphate, zinc white, lithopone, or other white pigment which is resistant to lime, or green chromium oxide, green ultramarine, blue ultramarine, green cobalt, smalts, graphite, soot, ivory black, red iron oxide, chrome red, sienna, red lead, manganese oxide, burnt sienna, chrome yellow, ocher and various others being suitable for this purpose. The blocks can also be given a coating of metal, for example by spraying the molten metal against the bricks, examples of such metals, being tin, zinc, lead, aluminum, copper, brass and their alloys. The blocks can also be coated or impregnated with dissolved tar, pitch or the like, the same being dissolved in suitable solvents such as petroleum products, benzene and the like.

I claim:—

1. In the manufacture of molded articles, the herein described improvement which comprises adding to a sand and hydrated lime mixture, a substantial amount of hydrated silicic acid, molding the mixture under pressure, and indurating the product under superatmospheric pressure with an elastic fluid capable of entering into reaction and produce a hardening of the molded article.

2. A process which comprises molding a wet mixture containing about 100 parts of sand, 3 parts of kieselguhr containing hydrated silicic acid and 8 parts of lime, and indurating the shaped body under superatmospheric pressure in an atmosphere containing steam or carbon dioxid.

3. In the process of claim 1, the addition of hydrated silicic acid to the mix at any stage prior to the molding operation.

4. In the process of claim 1, the addition of agents capable of accelerating the formation of calcium silicate as a bonding agent.

5. A mix for the formation of sand-lime bricks, blocks and other shaped articles, a mixture containing sand and hydrated lime together with an amount of hydrated silicic acid far greater than existing in ordinary sand and hydrated aluminum silicate.

In testimony whereof I affix my signature.

LUDWIG KERN.